United States Patent [19]

Boulos

[11] 4,379,777

[45] Apr. 12, 1983

[54] PURIFICATION OF METALLURGICAL GRADE SILICON

[75] Inventor: Maher I. Boulos, Sherbrooke, Canada

[73] Assignee: Universite de Sherbrooke, Quebec, Canada

[21] Appl. No.: 310,726

[22] Filed: Oct. 13, 1981

[30] Foreign Application Priority Data

Oct. 15, 1980 [CA] Canada .................................. 362410

[51] Int. Cl.³ .............................................. C01B 33/02
[52] U.S. Cl. ..................................... 423/348; 423/350; 204/164
[58] Field of Search .................. 423/348, 350; 204/164

[56] References Cited

U.S. PATENT DOCUMENTS

| | | | |
|---|---|---|---|
| 2,866,701 | 12/1958 | Strauss | 423/348 X |
| 2,953,438 | 9/1960 | Dale | 423/348 X |
| 2,992,080 | 7/1961 | Herrick | 423/348 X |
| 3,012,862 | 12/1961 | Bertrand | 423/348 X |
| 3,012,865 | 12/1961 | Pellin | 423/348 X |
| 3,020,129 | 2/1962 | Herrick | 423/348 X |
| 4,034,763 | 12/1981 | Dietl et al. | 423/348 |
| 4,207,360 | 6/1980 | Padovani | 423/348 X |

FOREIGN PATENT DOCUMENTS

| | | | |
|---|---|---|---|
| 2924584 | 1/1981 | Fed. Rep. of Germany | 423/348 |
| 33286 | 11/1964 | German Democratic Rep. | 423/348 |
| 1412038 | 8/1965 | France | 423/348 |

OTHER PUBLICATIONS

"Chem. Abst.", vol. 80, 1974, 41098.
G. Szeeyly, Preparation of Pure Silicon by the Hydrogen Reduction of Silicon Tetraiodide, J. of the Electrochemical Soc., 11/1957, pp. 663–667.
T. F. Ciszek et al., Solar-Grade Silicon by Directional Solidification in Carbon Crucibles, IBM J. Res. Develop., vol. 23, No. 3, 1979, pp. 270–277.

*Primary Examiner*—G. Peters
*Attorney, Agent, or Firm*—Cushman, Darby & Cushman

[57] ABSTRACT

There is disclosed a process for preparing ultra pure silicon from metallurgical grade silicon, which comprises (a) continuously passing powdered and acid-leached metallurgical grade silicon through an induction plasma; (b) quenching said treated particles whereby upon solidification of the molten particles, a portion of the impurities therein migrates to the surface of the granules obtained; (c) acid-leaching the surface impurities of the granules obtained in step (b); and (d) after drying the granules obtained, repeating steps (a), (b) and (c) until a silicon of the desired purity is obtained.

5 Claims, 1 Drawing Figure

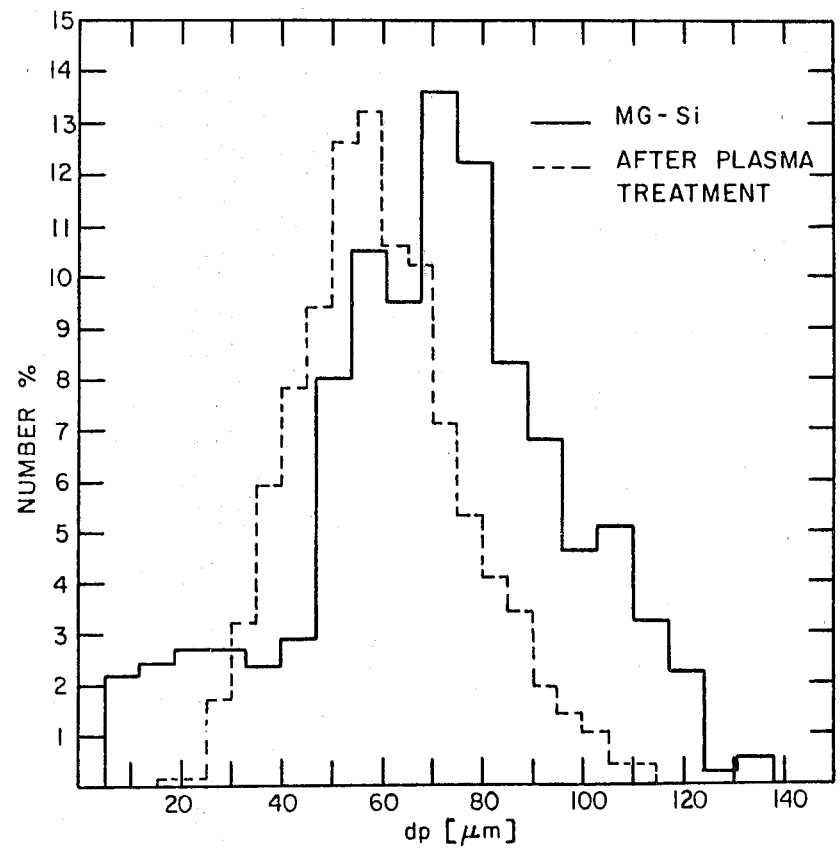
PARTICLE SIZE DISTRIBUTION OF THE MG-Si AND OF THE SILICON POWDER OBTAINED AFTER THE PLASMA TREAMENT.

PURIFICATION OF METALLURGICAL GRADE SILICON

BACKGROUND OF THE INVENTION

With the increasing cost and potential restrictions on availability of conventional fuels such as petroleum, natural gas, etc., as sources of energy, considerable research effort has been directed towards developing other sources of energy. One area which has been considered as an important alternative source of energy is solar energy. In most attempts to make use of the sun's energy, the main research effort has been directed toward developing inexpensive, large capacity devices known as solar cells which directly transform the sun's energy which initially is in the form of photons into electricity.

It is estimated that if part of the petroleum required to operate electric power plants in a country such as the United States could be replaced by solar energy, an approximate saving of about two million barrels of oil per day could be saved. In order to meet such an objective, solar power generation must be capable of producing 40 GW of electricity on a continuous basis. Assuming that solar is in general available about 20% of the day, 40 GW of continuous photovoltaic power would require 200 GW of solar array capacity, including a proper storage system.

In order to arrive at a cost which would justify changing petroleum-energy electric power plants to solar power energy electric power plants, a method of producing ultra pure silicon must be devised at a cost capable of competing with presently available sources of energy.

Presently, available procedures involve the use of chemical silicon vapor deposition on a bed of silicon seed particles (see U.S. Pat. No. 4,207,360), or the conversion of low grade silicon to high purity silicon by forming silicon tetraiodide. In general, such a starting silicon has a purity of about 99.8%. It is obvious that any procedure starting with silicon having such a high degree of purity will cause the obtained silicon to be very expensive.

Accordingly, it would appear highly desirable to provide a method for preparing ultra pure silicon from the unexpensive and readily available metallurgical grade silicon.

SUMMARY OF THE INVENTION

Essentially, the present invention provides a process for preparing solar grade silicon (SoG-Si) starting from metallurgical grade silicon (MG-Si). More specifically, the process of the present invention comprises passing powdered and acid leached metallurgical grade silicon through an induction plasma whereby upon solidification of the molten particles, the impurities migrate to the surface of the granules obtained and are substantially removed by further acid leaching.

DETAILED DESCRIPTION OF THE INVENTION

The process of the present invention for preparing ultra pure silicon comprises:

(a) acid-leaching of the matallurgical grade silicon in powder form;

(b) thermal treatment of the powder under plasma conditions;

(c) quenching the said treated particles whereby upon solidification of the molten granules a portion of the impurities therein migrate to the surface of the granules obtained;

(d) acid-leaching the surface impurities of the granules obtained in step (c); and (e) after drying the granules obtained, repeating steps (b), (c) and (d) until a silicon of the desired purity is obtained.

Reference is also made to the drawings wherein

FIG. 1 shows the particle size distribution of the MG-Si and of the silicon powder obtained after the plasma treatment.

The metallurgical grade silicon used as starting material is in powder form and is available commercially with a purity better than 98.0%. The particle size of the powdered metallurgical grade silicon used is less than 140 $\mu$m.

The acid leaching of the powdered metallurgical grade silicon is carried out in steps. The powder is first treated with boiling hydrochloric acid. This is followed by a second leaching with hydrofluoric acid (10%) at room temperature.

Following the acid leaching, the powder is dried and melted by passing it through the discharge zone of an inductively coupled plasma.

The equipment comprises of a 50 mm I.d. air-cooled induction plasma torch of standard design operated at atmospheric pressure. The torch has a 3 turn induction coil connected to a 4.8 MHz, 25 kW radio frequency power supply. Three gas streams are introduced in the torch. These are comprised mainly of argon with a small amount of hydrogen which helps to increase the enthalpy of the plasma and thus the efficiency of the powder treatment.

The powder is introduced in the plasma, at the center of the induction coil, by gravity feeding from a fluidized bed feeder. The residence time of the powder in the plasma zone is a few milliseconds. This was, however, long enough for the complete melting of the granules. As these came out of the plasma zone, the silicon droplets cooled down rapidly, and are collected at the bottom of the water-cooled quenching and collecting chamber.

Silicon particles, with a diameter less than 10 $\mu$m, were difficultly collected in this chamber and are, therefore, lost with the exhaust gases which are cleaned using a venturie scrubber before being vented to the atmosphere.

Once the plasma-treated powder is recovered in granule form, it is subjected to a second acid leaching carried out in the same manner as the first leaching. The plasma-treated powder is subjected to a one hour leaching with boiling hydrochloric acid, filtered and washed, and then it is subjected to a hydrofluoric acid treatment at room temperature for 12 hours. After filtration and washing, the powder is subjected to a second treatment with boiling hydrochloric acid for one hour, followed by filtration, washing and drying at 105° C.

The sequence of acid leaching, plasma treatment and acid leaching is repeated until silicon of the desired purity is obtained.

Analytical Techniques

In order to follow the progress of the purification process and the changes taking place in the particles, the following standard analytical techniques had to be used simultaneously.

Atomic Absorption Spectrophotometry (AAS)

The efficiency of the leaching operation could be determined by following the concentration of the impurities in the silicon, or in the leaching solution. In most cases, both are carried out. Atomic absorption spectrophotometry (AAS) has the advantage of its very low detection limits but necessitated having the material to be analysed in solution form. It is therefore used for the determination of the concentration of the various impurities in the filtrate at the end of every leaching operation. In order to avoid HF interference, the filtrate is first heated to dryness and then the solids put into solution again.

Neutron Activation Analysis (NAA)

Neutron Activation Analysis is carried out to determine the level of the different impurities in the silicon powder. The analysis is made using the slowpoke reactor at the University of Montreal. For each analysis a 2 g sample of the powder is used. The results reported here are the average of at least two or three analysis of the same materials. The elements determined were Ti, V, Mn, Cr, Fe and Cu.

Optical and Scanning Electron Microscopy

Optical and scanning electron microscopy is used to determine any changes in the shape and the surface caracteristics of the silicon particles during the different stages of the leaching and plasma treatment processes.

X-ray Fluorescence Probe Analysis

This analytical technique is used in an attempt to measure the details of the concentration profiles of the impurities in the silicon granules after the plasma treatment. The results are, however, not conclusive due to the overall low level of the impurities in the particles which is below the detection limit for this technique.

The present invention will be more readily understood by referring to the following Example which is given to illustrate the invention.

EXAMPLE 1

The Raw Material Used

The example is carried out using as a starting material a commercially available powdered MG-Si supplied by Union Carbice at Beauharnois, Quebec. Due to its wide size distribution, the powder is first sized using a sedimentation technique, in water, to remove the fines. This is followed by wet screening. The powder used has a mean particle diameter of 72 $\mu$m and a standard deviation of 25 $\mu$m. The complete size distribution of the powder is given by the solid line on FIG. 1. The amount of impurities in the powdered MG-Si used, obtained using Neutron Activation Analysis, is given in column (1) of Table 1.

First Acid Leaching

HCl leaching

The acid leaching experiments are carried out on 50 g samples of the powdered MG-Si. In each experiment 50 g of the MG-Si is mixed with 50 ml of dilute HCl in a 150 ml beaker. The HCl stock solution used was prepared ahead of time by diluting concentrated HCl with an equal amount of distilled water.

The MG-Si powder/HCl sludge is then heated to boiling and kept under boiling conditions for one hour. The sludge is then filtered and thoroughly washed with distilled water. The loss in the weight of the sample as a result of the treatment under typical conditions is less than 0.6%.

HF leaching

The MG-Si obtained is the mixed with 100 ml of dilute hydrofluoric acid solution (10% W) in a 150 ml teflon beaker and left at room temperature for 12 hours. The MG-Si sludge is then filtered and washed with distilled water. The percentage loss in the weight of the MG-Si sample usd in this treatment is between 3–5%. The amount of impurities left in the MG-Si powder after this treatment, as obtained by NAA, is given in column (2) of Table 1.

HCl leaching

The MG-Si powder obtained is then subjected to another HCl treatment under essentially the same conditions as the previous HCl treatment except for using 100 ml of the dilute HCl per 50 g of the MG-Si and for keeping the sludge under boiling conditions for 12 hours. In this case the treatment is carried out in a 500 ml flask fitted with a reflux condenser. At the end of the 12 hours treatment, the MG-Si/HCl sludge is filtered and washed using distilled water. The result of NAA of the powder at the end of this step is given in column (3) of Table 1.

HF leaching

The next treatment of the powder was with hydrofluoric acid under identical conditions as those used in the previous HF treatment described in section 2.2. The percentage loss in the weight of the MG-Si sample used is, however, only 0.7–1%. The powder obtained has the NAA analysis given in column (4) of Table 1.

HCl leaching

The sample is then subjected to another HCl treatment under identical conditions as those described in section 2.3. The result of the NAA of the powder obtained is given in column 5 of Table 1.

It should be pointed out that based on the analysis of the MG-Si obtained as a result of the last three HCl, HF and HCl treatment, it seems that only the first HCl/HF treatment was realy effective in reducing the impurities and that the plasma treatment could be envigage directly after this treatment.

Plasma treatment

The powder MG-Si, after acid leaching and drying, is injected in the center of the discharge region of the induction plasma. The operating conditions of the plasma torch and the powder feed rate are as follows.

| (a) | Gas streams | |
|---|---|---|
| | -Sheath gas (Argon) | 46.0 l/min |
| | -Plasma gas (Argon) | 7.0 l/min |
| | (Hydrogen) | 0.7 l/min |
| | -Central gas (Argon) | 1.0 l/min |
| (b) | Power | |
| | -Plate voltage | 7 Kv |
| | -Plate current | 2.6 A |
| | -Grid current | 0.4 A |
| | -Tank circuit power | $\simeq$ 15.4 kW |
| | -Coupling efficiency | $\simeq$ 50–60% |
| (c) | Powder feed rate | |
| | -The powder feed rate | 12 g/min |

A typical run lasted about 30 min. The result of Neutron Activation and particle size analysis of the powder obtained after the plasma treatment is given in column (6) of Table 1 and on FIG. 1 respectively.

Second acid leaching

Following the plasma treatment the powder is screened using a 100 Mesh screen to remove particle agglomerates of diameter larger than 150 μm. The powder is then washed with distilled water and dried before being subjected to further acid leaching.

HCl leaching

This HCl leach is carried out on 50 g samples of the powdered silicon after plasma treatment. The conditions are essentially the same as those used in section 2.1 except for the increased phase ratio (250 ml HCl per 50 g sample of the silicon). The treatment is carried out under boiling conditions for only one hour followed by filtration, and washing with distilled water. The analysis of the powder obtained after this treatment is given in column (7) of Table 1.

HF leaching

The following treatment is one with hydrofluoric acid under similar conditions as that used in section 2.2 except for using again a larger phase ratio (ie 200 ml HF per 50 g silicon powder) and for limiting the treatment to a 4.5 hour period. This is followed by filteraction, washing with distilled water and drying. The results of NAA of the silicon obtained is given in column (8) of Table 1.

It is to be noted from Table 1 that, while the acid treatment 2.3, 2.4 and 2.5 seems to have little success in reducing the impurity level in the silicon powder, the situation is not the same after the plasma treatment where further acid leaching, treatment 4.1 and 4.2, is successful in reducing the impurities in the silicon to a level close to that required by the Czochralski method of solar grade silicon single crystal growing as given in column (9) of Table 1.

Based on optical and scanning electron microscope observations, it is noticed that the leaching operations results in an elimination of the very fine silicon particles adhering to the surface of the larger silicon particles. As expected, the plasma treatment results in a spheroidization of the particles. This is, however, accompanied by the appearance of a rather curious "tail" protruding from every particle. Detailed examination of the surface of the particle around that protrusion using a magnification of 1000-5000 gives some indication that these protrusions are the result of the rapid quenching of the molten silicon droplets at the exit of the plasma reactor. There is also some evidence of the formation of fine crystals appearing on the surface of the particles which, if containing a higher concentration of the impurities, could account for the relatively higher efficiency of the acid leaching operation following the plasma treatment.

TABLE 1

Neutron activation analysis of the silicon at different stages of the purification process, ppm.

| Element | MG—Si (1) | First leaching | | | | Plasma treatment (6) | Second leaching | | Cz—Si* (9) | SOG—Si (10) |
|---|---|---|---|---|---|---|---|---|---|---|
| | | HCl/HF (2) | HCl (3) | HF (4) | HCl (5) | | HCl (7) | HF (8) | | |
| Ti | 308 | 5.3 | 26.0 | 21.8 | 21.3 | 6.6 | 12.0 | 5.8 | 5.0 | 0.002 |
| V | 22.7 | 0.2 | 1.3 | 0.4 | 0.4 | 0.3 | 0.4 | 0.04 | 5.0 | 0.004 |
| Mn | 302 | 3.7 | 12.8 | 2.6 | 3.0 | 1.4 | 1.6 | 0.3 | 5.0 | 0.039 |
| Cr | 35 | 3.9 | 1.5 | 0.9 | 1.4 | 0.9 | 0.02 | <3.7 | 5.0 | 0.037 |
| Fe | 10400 | 163 | 748 | 132 | 181 | 274 | 99 | 95.4 | 25.0 | 0.040 |
| Cu | 54 | 18.7 | 16.2 | 18.4 | 7.4 | 3.0 | <5.1 | 0.56 | 5.0 | 0.045 |

*Maximum impurity level for Solar grade silicon single crystal growing by the czochralski method

I claim:

1. Process for preparing ultra pure silicon which comprises:
   (a) continuously passing powdered and acid-leached metallurgical grade silicon through an induction plasma to melt the silicon;
   (b) quenching said molten silicon particles whereby upon solidification of the molten particles, a portion of the impurities therein migrates to the surface of the granules obtained;
   (c) acid-leaching the surface impurities of the granules obtained in step (b); and
   (d) after drying the granules obtained, repeating steps (a), (b), and (c) until a silicon of the desired purity is obtained.

2. The process of claim 1, wherein the acid leaching comprises a first treatment with boiling hydrochloric acid, and after filtration a second treatment with hydrofluoric acid.

3. The process of claim 1 wherein one of the impurities is iron and steps (a), (b), and (c) are repeated until the iron content is reduced.

4. The process of claim 3 wherein the acid leaching comprises a first treatment with boiling hydrochloric acid, and after filtration a second treatment with hydrofluoric acid.

5. The process of claim 1 wherein the plasma treatment is carried out in an inductively coupled radio frequency torch.

* * * * *